United States Patent [19]
Schwartzman

[11] 3,802,279
[45] Apr. 9, 1974

[54] DRIVE MECHANISM

[76] Inventor: Gilbert Schwartzman, 8 Woodworth Ave., Yonkers, N.Y.

[22] Filed: Feb. 5, 1973

[21] Appl. No.: 329,446

[52] U.S. Cl. .................................................. 74/88
[51] Int. Cl. ............................................. F16h 27/02
[58] Field of Search ........................................ 74/88

[56] References Cited
UNITED STATES PATENTS

| | | | |
|---|---|---|---|
| 2,872,958 | 2/1959 | Popeil | 74/88 |
| 3,223,072 | 12/1965 | Bross | 74/88 |
| 3,587,333 | 6/1971 | Duncan | 74/88 |

Primary Examiner—Benjamin W. Wyche
Assistant Examiner—Wesley S. Ratliff, Jr.
Attorney, Agent, or Firm—Kenneth S. Goldfarb

[57] ABSTRACT

A mechanism for translating linear movement to rotary movement comprising a contact ring integrally interconnected with a toothed ring spaced therefrom by a plurality of helical springs. A driven member engages the toothed ring which is preferably of a bellows construction so that movement of the contact ring toward the toothed ring causes a diametrical dimension change and facilitates rotation of the toothed ring and engagement thereof with the driven member.

6 Claims, 5 Drawing Figures

PATENTED APR 9 1974　　　　　　　　　　　　　　　3,802,279

DRIVE MECHANISM

BACKGROUND OF THE INVENTION

1. Field of the Invention

This invention relates to a mechanism adapted for translating linear movement into rotary movement and may be used as a clutch mechanism, a drive mechanism, or any other similar mechanical expedient.

2. Description of the Prior Art

Various types of spring mechanisms have been used in the past for clutches and for changing linear movement into rotary movement. These mechanisms have heretofore required numerous separate and distinct parts and are usually difficult to assemble and costly to manufacture.

The present invention envisions a similar integral member adapted to be moved at one end in a linear fashion and to transmit such motion into a rotary motion by intermittent reciprocation of a contact ring.

SUMMARY OF THE INVENTION

The present invention employs a contact ring integrally molded with a bellows-type toothed ring spaced therefrom and interconnected therewith by a plurality of helical coil springs. With a contact ring of a larger size than the resilient toothed ring, the toothed ring will be contracted by the force of the helical springs to engage the driven member. On the other hand, if the resilient toothed ring is of a larger size than the contact ring, it will be expanded by the action of the springs to engage the driven member.

The present invention is adapted for use on various types of mechanisms requiring successive partial rotations of a driven member such as are used in calendars, display devices, and the like.

These, together with the various ancillary objects and features of the present invention, which will become apparent as the following description proceeds, are attained by this actuation mechanism, preferred embodiments of which are illustrated in the accompanying drawing, by way of example only, wherein:

DETAILED DESCRIPTION OF THE INVENTION

Figure 1:
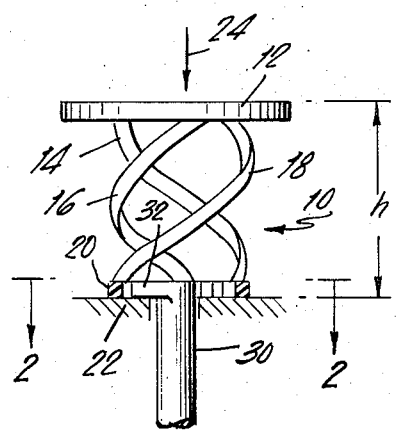
FIG. 1 is an elevational view of a mechanism according to the invention with parts thereof being broken away to shown other parts in detail.

With continuing reference to the accompanying drawing, wherein like reference numerals designate similar parts throughout the various views, reference numeral 10 is used to generally designate the drive mechanism for translating linear motion to rotary movement according to the invention. This mechanism includes a contact ring 12 to which a plurality of helical coil springs 14, 16 and 18 are integrally attached which are also integrally attached to a resilient toothed ring 20, which is mounted for rotation and diametrical dimension change on any suitable bearing surface 22 so that pressure downwardly in the direction of the arrow 24 will cause the compression of the springs 22 and rotation of ring 20.

Figure 2:
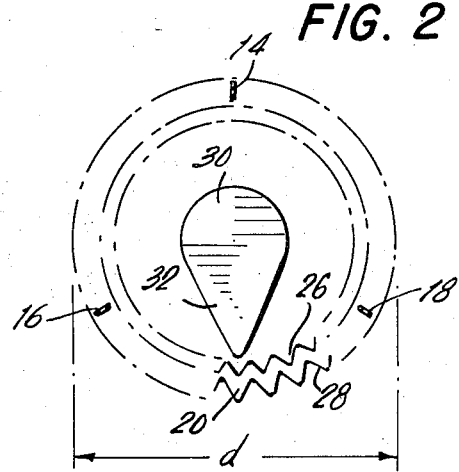
FIG. 2 is a horizontal sectional view taken along the plane of line 2—2 in FIG. 1.
Figure 3:
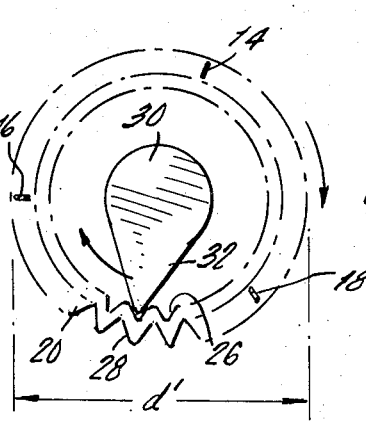
FIG. 3 is a view similar to FIG. 2, but showing the invention during operation.

As can be seen best in FIG. 2, toothed ring 20 is of a bellows configuration having internal teeth 26 and external teeth 28. Mounted on a shaft 30 coaxial with the rings 12 and 20 is a driven member 32. The driven member 32 may be connected to any device requiring successive linear increments of rotation for operation thereof. When ring 12 is of considerably larger diameter than the ring 20, depression thereof in the direction of arrow 24 causes the springs to exert a downwardly and inwardly compressive force on the ring 20 causing it to become of reduced diameter and be compressed in size while also causing the rotation thereof, thus facilitating rotation of driven member 32 as shown in FIG. 3. Release of the contact ring 12 results in the diametrical enlargement of the ring 20 to a position as shown in FIG. 2 out of engagement with the driven member 32.

Figure 4:
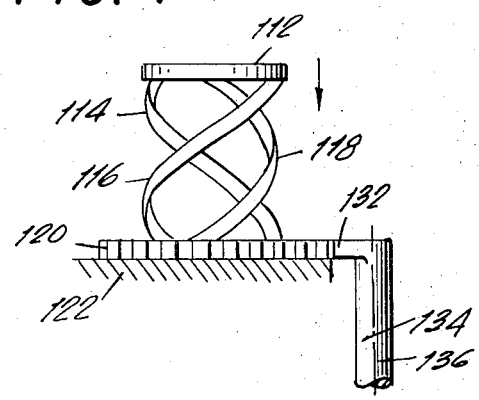
FIG. 4 is an elevational view similar to FIG. 1, but showing a modified form of the invention; and, FIG. 5 is a horizontal sectional view of the modified form of the invention during operation.
Figure 5:
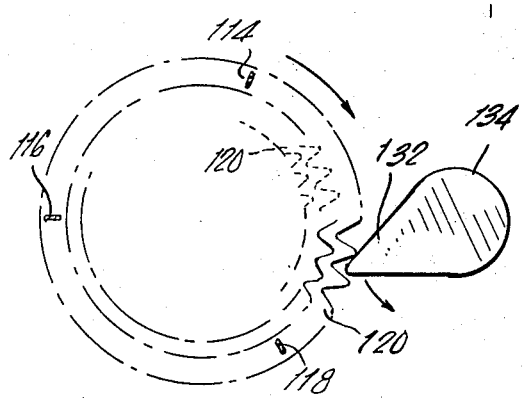

Referring now to FIGS. 4 and 5 herein, the contact ring 112 is of a lesser size than the bellows-type toothed ring 120 and is interconnected therewith by helical coil springs 114, 116, and 118. The driven member 132 is mounted on a shaft 134 for rotation about axis 136 not in alignment with the axis of the rings 12 and 20.

In operation, the depression of the rigid contact ring 112 toward the resilient toothed ring 120 causes a diametrical expansion of the toothed ring 112 so that the outer teeth thereof engage the driven member 132 and rotate it at an increment of its rotation.

The contact rings and toothed rings and the helical springs are all integrally molded out of any suitable thermoplastic resin, such as an acetal resin, polypropylene, or polyethylene.

A latitude of modification, substitution and change is intended in the foregoing disclosures, and in some instances some features of the present invention may be employed without a corresponding use of other features.

I claim:

1. A mechanism for translating linear movement to rotary movement comprising a contact ring upon which a linear force can be applied in the direction of the axis of said ring, a toothed ring spaced from said contact ring, a plurality of spaced helical springs integrally interconnecting said contact ring and said toothed ring, and a driven member engaging said toothed ring, and means mounting said driven member for rotation about an axis.

2. A mechanism according to claim 1, including means moving said contact ring toward said toothed ring.

3. A mechanism according to claim 2, wherein said toothed ring is of a bellows configuration.

4. A mechanism according to claim 3, wherein said contact ring is of greater diameter than said toothed ring so that movement of said contact ring toward said toothed ring causes rotation of said toothed ring and contraction thereof into engagement with driven member.

5. A mechanism according to claim 3, wherein said driven member is disposed within said toothed ring.

6. A mechanism according to claim 3, wherein said contact ring is of lesser diameter than said toothed ring so that movement of said contact ring toward said toothed ring causes rotation of said toothed ring and expansion thereof into engagement with said driven member.

* * * * *